United States Patent [19]

Maltby, Jr. et al.

[11] Patent Number: 5,209,767

[45] Date of Patent: * May 11, 1993

[54] GLASS SHEET ANNEALING LEHR HAVING GAS SUPPORT CONVEYOR

[75] Inventors: Robert E. Maltby, Jr., Wayne; Harold A. McMaster, Perrysburg; Philip J. Breno, Oregon; James W. Buckingham, Pemberville, all of Ohio

[73] Assignee: Glasstech, Inc., Perrysburg, Ohio

[*] Notice: The portion of the term of this patent subsequent to Jan. 7, 2009 has been disclaimed.

[21] Appl. No.: 671,505

[22] Filed: Mar. 19, 1991

[51] Int. Cl.[5] .......................................... C03B 25/093
[52] U.S. Cl. ................................. 65/182.2; 65/162; 65/194; 65/348
[58] Field of Search ............... 65/162, 182.2, 351, 65/25.2, 119, 194, 348, 349, 95; 34/160, 159; 432/59, 8, 176

[56] References Cited

U.S. PATENT DOCUMENTS

| | | | |
|---|---|---|---|
| 1,622,817 | 3/1927 | Waldron | 65/182.2 |
| 1,848,097 | 3/1932 | Adams | 65/182.2 |
| 3,070,901 | 1/1963 | Allander | 65/182.2 |
| 3,223,498 | 12/1965 | Davidson | 65/25.2 |
| 3,294,518 | 12/1966 | Laseck | 65/348 |
| 3,355,275 | 11/1967 | Sensi | 65/182.2 |
| 3,506,422 | 4/1970 | Walters | 65/182.2 |
| 3,687,648 | 8/1972 | Oulton | 65/182.2 |
| 4,059,426 | 11/1977 | Starr | 65/182.2 |
| 4,749,400 | 6/1988 | Mouly et al. | 65/97 |
| 5,018,661 | 5/1991 | Cyb | 228/175 |
| 5,078,775 | 1/1992 | Maltby, Jr. | 65/354 |

Primary Examiner—Joye L. Woodard
Attorney, Agent, or Firm—Brooks & Kushman

[57] ABSTRACT

A glass sheet strip annealing lehr (16) is disclosed as including a housing (18) along which a conveyor (26) including a gas support (28) supports a glass sheet strip G by pressurized gas for movement between entry and exit ends (22,24) of the housing before a conveyor drive (32) engages the strip after the surfaces thereof are cooled below the strain point. Best results are achieved when the glass sheet strip is supported only by the gas support (28) until its surfaces are placed in compression. Lower and upper manifolds (34,36) respectively support and convey the glass sheet strip within the housing (18) preferably by a recirculating gas flow supplied by gas burner (76) and associated gas jet pumps (78).

17 Claims, 6 Drawing Sheets

GLASS SHEET ANNEALING LEHR HAVING GAS SUPPORT CONVEYOR

TECHNICAL FIELD

This invention relates to an annealing lehr for annealing a glass sheet strip.

BACKGROUND ART

Glass sheets are conventionally made by forming a continuous glass sheet strip that is slowly cooled in an annealing lehr to provide annealing so as not to generate internal stresses that are so great as to prevent the strip from subsequently being cut into sheets of a discrete length. Conventional processing forms the glass sheet while floating on a molten metal bath of tin and then delivers the glass sheet from the tin bath to the annealing lehr for the slow cooling. Prior to entering the annealing lehr, the lateral edge portions of the glass sheet can be trimmed in a hot condition as disclosed by U.S. Pat. No. 4,749,400 Mouly et al. During the annealing, the temperature of the glass sheet strip is slowly cooled from the "annealing point" which is normally in the range of about 1000° to 1040° Fahrenheit (about 495° to 560° centigrade) to the strain point which is generally in the range of about 925° to 970° Fahrenheit (about 495° to 520° centigrade). Between 925° and 1040° Fahrenheit (540° to 560° centigrade) is conventionally referred to as the "annealing range". More specifically, both the annealing point and the strain point between which the annealing range extends are defined as temperatures that correspond either to a specific rate of elongation of a glass fiber when measured by ASTM Method C336 or a specific rate of midpoint deflection of a glass beam when measured by ASTM Method C598. Internal stresses of a glass sheet at the annealing point are substantially relieved in minutes, while internal stresses at the strain point are substantially relieved in hours.

During conventional annealing, the continuous glass sheet strip is supported on conveyor rolls for conveyance from the annealing point to the strain point through the annealing range. Since the glass is relatively soft at the annealing point, its surfaces can be deformed by engagement with the conveyor rolls and thereby adversely affect optical quality and mechanical strength.

DISCLOSURE OF INVENTION

An object of the present invention is to provide an improved annealing lehr for annealing a hot glass sheet strip without engaging the strip during slow cooling during the annealing range so as to provide good optical quality and mechanical strength to the annealed glass.

In carrying out the above object and other objects of the invention, a glass sheet strip annealing lehr constructed in accordance with the present invention includes a housing defining a heated chamber and having an entry end for receiving a continuous hot glass sheet strip just after forming of the strip prior to cooling below the annealing point. The housing also has an exit end from which the strip exits the heated chamber. Within the housing, the heated chamber has a decreasing temperature from the entry end of the housing toward the exit end thereof to provide relatively slow cooling that anneals the strip. A conveyor of the annealing lehr includes a gas support that delivers upwardly directed pressurized gas to provide the sole support of the glass sheet strip within the housing until the surfaces of the strip are cooled below the strain point. The conveyor also includes a drive for engaging the strip after the surfaces thereof are cooled below the strain point to pull the strip from the entry end of the housing toward the exit end thereof over the gas support.

In the preferred construction of the annealing lehr, the gas support of the conveyor provides the sole support for the glass sheet strip until the surfaces of the strip are placed in compression by the cooling which normally takes place as the center of the continuous glass sheet strip begins to cool at a faster rate than the surfaces as the glass approaches ambient temperature.

The preferred construction of the glass sheet strip annealing lehr has the gas support of the conveyor constructed to include a lower manifold to which the pressurized gas is fed for upward flow that impinges with the glass sheet strip to provide the support of the strip, and the gas support of the conveyor also includes an upper manifold to which gas is fed for downward flow that impinges with the glass sheet strip to cooperate with the upward gas flow in providing uniform forced convection heat transfer with the lower and upper surfaces of the strip. Each of the lower and upper manifolds includes supply openings through which the pressurized gas is fed for impingement with the glass sheet strip, and each manifold also includes exhaust openings through which the gas is exhausted after impingement with the glass sheet strip. Each manifold has the supply and exhaust openings thereof provided with elongated shapes that extend transversely to the direction of movement of the glass sheet strip. These supply and exhaust openings of each manifold are in an alternating relationship along the direction of movement of the glass sheet strip.

In each of two preferred embodiments disclosed, each manifold is construction with each elongated exhaust opening having opposite ends and a central portion between the opposite ends and with the opposite ends of each exhaust opening having a progressively increasing flow area in a direction toward the central portion thereof to prevent a gas pressure buildup at the center of the strip. Both of the preferred embodiments have the supply openings thereof inclined so as to provide driving of the glass sheet strip by the pressurized gas flow toward the exit end of the housing. Between the entry and exit ends of the housing, the conveyor preferably includes a plurality of sets of the lower and upper manifolds that provide the forced convection cooling of the glass sheet strip.

In one preferred embodiment, each manifold of the annealing lehr is molded from refractory material and preferably includes a cast platen having a surface that defines the supply and exhaust openings which have elongated shapes that extend transversely to the direction of movement of the glass sheet strip and are arranged in an alternating relationship with respect to each other. Each manifold also includes a cast manifold member that feeds the pressurized gas to the supply openings of the platen and receives the gas from the exhaust openings of the platen for recirculating flow back to the supply openings. Each manifold preferably further includes a gas burner and at least one gas jet pump mounted by the manifold member to receive pressurized and heated products of combustion from the gas burner for mixing with the gas returned from the exhaust openings for recirculating flow back to the supply openings.

In the preferred construction of the refractory molded manifold which includes the cast platen as well as the cast manifold member, the manifold member includes two pairs of spaced side walls with each pair of spaced side walls defining a return passage for receiving gas from the exhaust openings of the platen. A plurality of the gas jet pumps are mounted on each pair of side walls and function to mix the pressurized and heated products of combustion received from the gas burner with the gas returned from the exhaust openings of the platen for the recirculating flow back to the supply openings of the platen. The two pairs of spaced side walls are spaced from each other to define a mixing plenum in which the pressurized gas is received from opposite directions from the gas jet pumps for mixing prior to being fed to the supply openings of the platen.

Each manifold member of the refractory embodiment of the manifold also preferably includes temperature controllers for controlling the temperature of the pressurized gas delivered from the mixing plenum to the supply openings of the platen. These temperature controllers each include an electric resistance element to which a voltage is applied as needed to provide the proper degree of additional heating for heating the gas that provides the forced convection heating upon being delivered to the supply openings of the platen.

Each manifold member of the refractory embodiment of the manifold also includes vertical walls spaced along the direction of movement of the glass sheet strip to divide the mixing plenum with one temperature controller and a pair of oppositely directed gas jet pumps located between each pair of vertical walls. The pair of oppositely directed gas jet pumps that feed pressurized gas between each pair of vertical walls of the manifold member are located at different elevations to provide a circular mixing flow. This circular mixing flow takes place away from the temperature controller with respect to the plane of strip conveyance at a location between the two vertical walls involved.

In another preferred embodiment disclosed, each manifold is fabricated from sheet metal as opposed to being molded from factory material.

The conveyor drive of the annealing lehr as disclosed includes a roller that engages the lower surface of the glass sheet strip to pull the strip from the entry end of the housing toward the exit end thereof over the gas support. Thus, in the preferred construction, the roller of the drive pulls the glass sheet strip between the lower and upper manifolds of the gas support whose forced convection with the lower and upper surfaces provides the slow cooling of the strip for the annealing.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
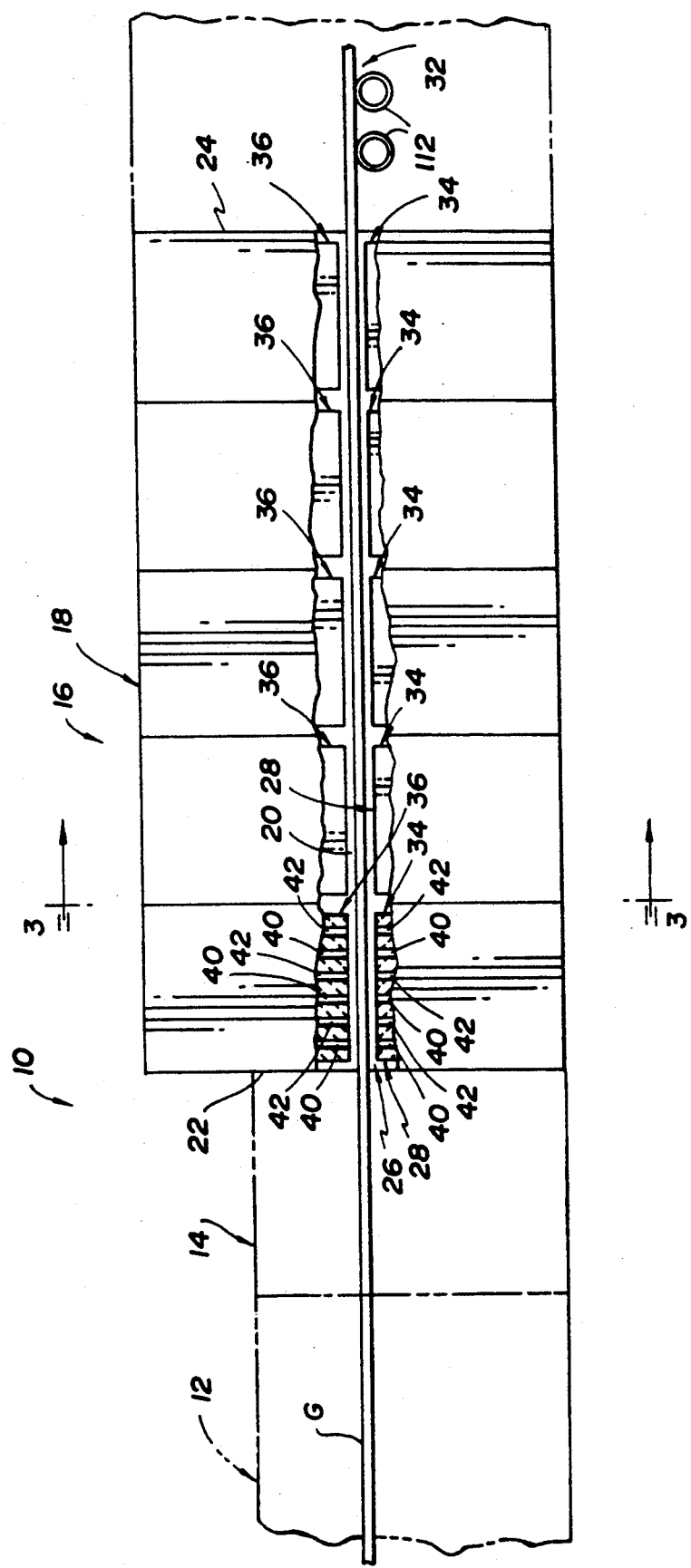
FIG. 1 is a somewhat schematic side elevational view of a glass sheet strip annealing lehr constructed in accordance with the present invention.

With reference to FIG. 1 of the drawings, a glass sheet forming system is generally indicated by 10 and includes a forming station 12 at which a continuous hot glass sheet strip G is formed, a trimming station 14 at which the lateral edge portions of the hot glass sheet strip are trimmed, and an annealing lehr 16 that is constructed in accordance with the present invention to provide annealing of the glass sheet strip prior to cutting of the strip into glass sheets of discrete lengths. The forming station 12 may be of any conventional construction but normally will provide forming of the hot glass sheet strip G by floating thereof on a bath of molten metal that conventionally is hot tin. After leaving the forming station 12, the glass sheet strip G passes through the trimming station 14 as mentioned above where its lateral edge portions may be trimmed to remove any edge irregularities present prior to entering the annealing lehr 16 for annealing. However, it should be mentioned that any type of forming of the glass sheet strip G can be utilized and that it is not absolutely necessary for edge trimming to be performed prior to delivery of the glass sheet strip to the annealing lehr 16 of the present invention for the slow cooling that provides annealing.

With continuing reference to FIG. 1, the glass sheet strip annealing lehr 16 of this invention includes a housing 18 defining a heated chamber 20 and has an entry end 22 for receiving the continuous hot glass sheet strip G just after forming of the strip. The housing 18 also has an exit end 24 from which the glass sheet strip exits the heated chamber 20. Along the length of the housing 18, the heated chamber 20 has a decreasing temperature from the entry end 22 of the housing toward the exit end 24 of the housing to provide relatively slow cooling that anneals the glass sheet strip G.

Figure 3:
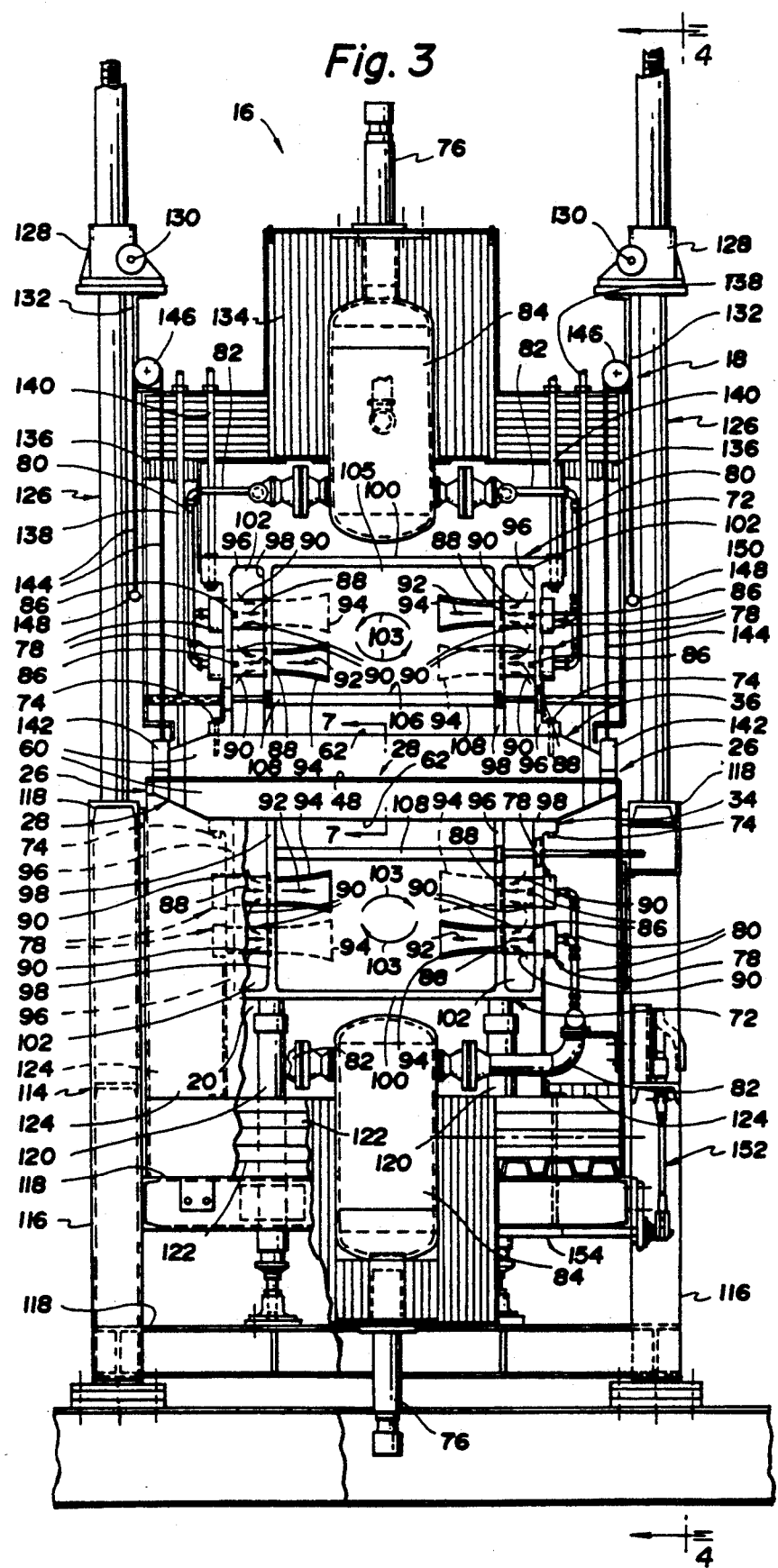
FIG. 3 is a cross-sectional view of the annealing lehr taken generally along the direction of line 3—3 in FIG. 1.
Figure 7:
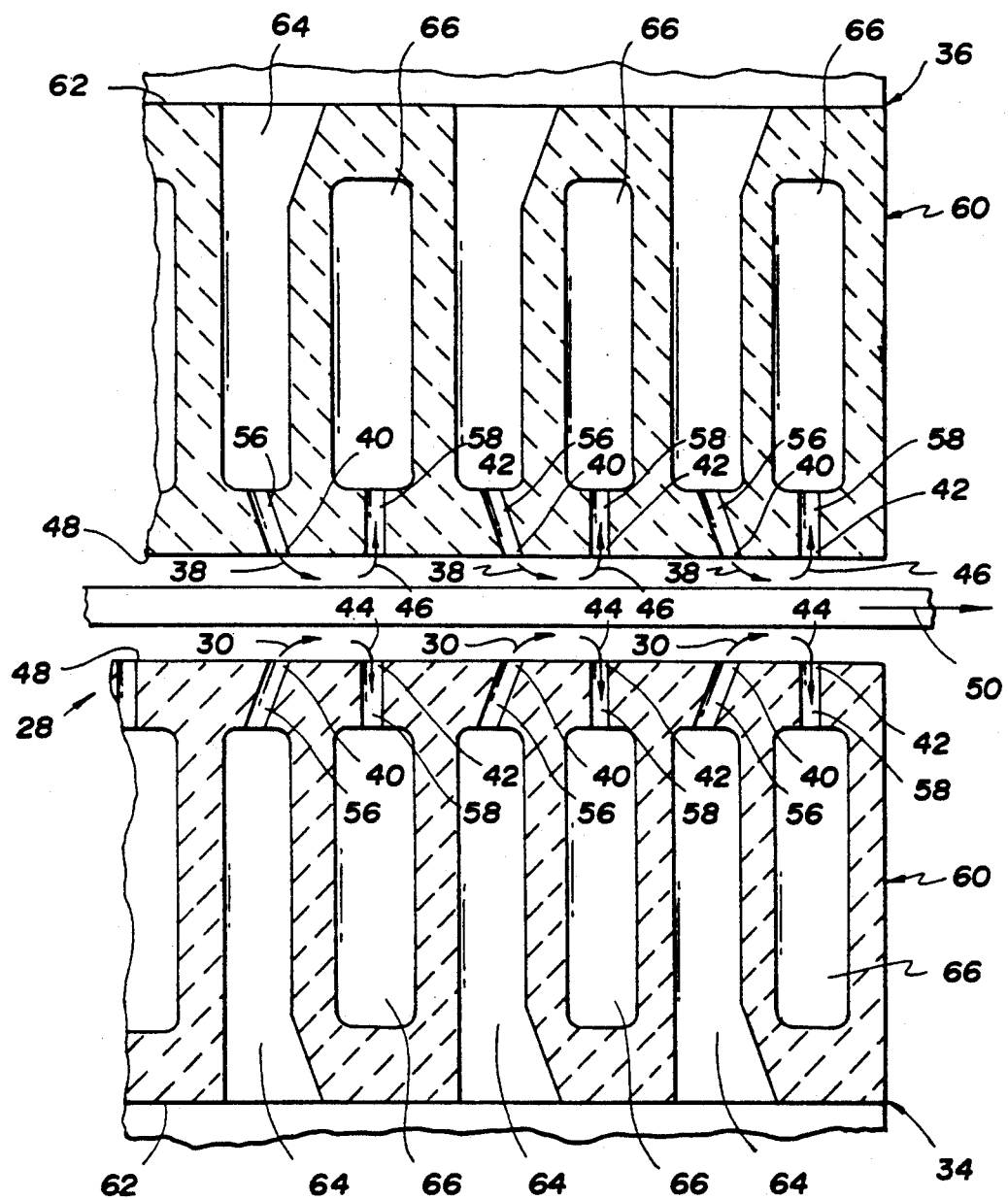
FIG. 7 is a sectional view taken along the direction of line 7—7 in FIG. 3 through lower and upper platens of lower and upper manifolds and illustrates the way in which the pressurized gas is recirculated for impingement with the glass sheet strip.

As best illustrated by combined reference to FIGS. 1 and 3, a conveyor 26 of the annealing lehr includes a gas support 28 that delivers upwardly directed pressurized gas as illustrated by arrows 30 in FIG. 7. This upwardly directed pressurized gas provides the sole support of the glass sheet strip within the annealing lehr housing 18 shown in FIG. 1 until the surfaces of the strip are cooled below the strain point. A drive 32 of the conveyor 26 engages the glass sheet strip G as shown in FIG. 1 after the surfaces thereof are cooled below the strain point and pulls the strip from the entry end 22 of the housing toward the exit end 24 thereof over the gas support 28.

As such, the surfaces of the glass sheet strip G are not mechanically engaged during the annealing within the annealing lehr housing 18 in order to preserve optical qualities of the glass sheets that are ultimately cut from the continuous strip.

Best results are achieved when the gas support 28 provides the sole support for the glass sheet strip G until the surfaces of the glass sheet strip are placed in compression by the cooling. More specifically, this compression of the surfaces is generated after the glass sheet strip has been cooled sufficiently so that the temperature gradient between its surfaces and its center begins to disappear as the cooling slows at ambient temperature. The drive 32 then engages the glass sheet strip after the surfaces thereof are placed in compression by the cooling to pull the strip from the entry end 22 of the housing 18 toward the exit end 24 thereof over the gas support 28 of conveyor 26.

As illustrated by combined reference to FIGS. 1 and 3, the gas support 28 of the conveyor 26 preferably includes a lower manifold 34 to which the pressurized gas is fed for upward flow that impinges with the glass sheet strip G to provide the support of the strip as illustrated by arrows 30 in FIG. 7. Furthermore, the gas support 28 illustrated in FIGS. 1 and 3 also includes an upper manifold 36 to which gas is fed for downwardly directed flow that impinges with the glass sheet strip G as illustrated by arrows 38 in FIG. 7 to cooperate with the upward gas flow in providing uniform forced convection heat transfer with the lower and upper surfaces of the glass sheet strip G.

Figure 6:
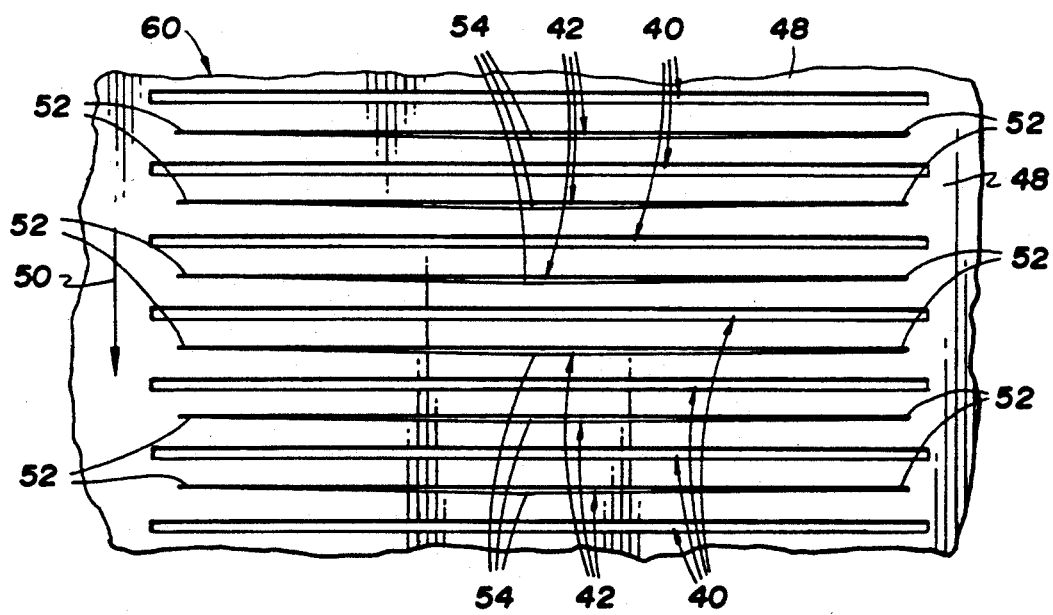
FIG. 6 is a plan view of the platen taken along the direction of line 6—6 in FIG. 3 and illustrates the construction of supply and exhaust openings through which the pressurized gas is fed for recirculating flow.

As illustrated by combined reference to FIGS. 1 and 7, each of the lower and upper manifolds 34 and 36 includes supply openings 40 through which the pressurized gas is fed for impingement with the glass sheet strip G. Each of the lower and upper manifolds 34 and 36 also includes exhaust openings 42 through which the gas is exhausted after impingement with the glass sheet strip G as illustrated in FIG. 7 by arrows 44 and 46 respectively associated with the lower and upper manifolds. Each of the manifolds as shown in FIG. 6 has a horizontally extending planar surface 48 at which the supply and exhaust openings are defined. These supply and exhaust openings 40 and 42 preferably have elongated slit shapes that extend transversely with respect to the direction of movement of the glass sheet strip as identified by arrow 50. Supply and exhaust openings 40 and 42 of each manifold are in an alternating relationship along the direction of movement of the glass sheet strip so as to permit a recirculating flow of gas as is hereinafter more fully described. Each elongated exhaust opening 42 has opposite ends 52 and a central portion 54 between the opposite ends. These exhaust openings 42 each have a progressively increasing flow area in a direction from its ends 52 toward the central portion 54 thereof to prevent a gas pressure buildup at the center of the glass sheet strip. More specifically, as illustrated, the exhaust openings 42 have an increasing width from the ends 52 toward the central portion 54 to prevent the gas pressure buildup at the center of the glass sheet strip which is adjacent the central portion 54 of the exhaust openings.

As shown best by FIG. 7, each of the lower and upper manifolds 34 and 36 has supply passages 56 that are inclined and feed the supply openings 40 so as to provide driving of the glass sheet strip by the pressurized gas flow toward the exit end of the housing. This driving takes place by providing the inclination to the upward and downward gas flows identified by arrows 30 and 36 such that these gas flows tend to move the glass sheet G in the direction of arrow 50 which is toward the exit end of the housing.

As illustrated in FIG. 1, the conveyor 26 preferably includes a plurality of sets of the lower and upper manifolds 34 and 36 between the entry and exit ends 22 and 24 of the housing 18 of the annealing lehr 16. More specifically, five sets of the lower and upper manifolds 34 and 36 are illustrated; however, a greater or less number of the manifold sets can be utilized depending upon sizing and the processing parameters desired.

Figure 5:
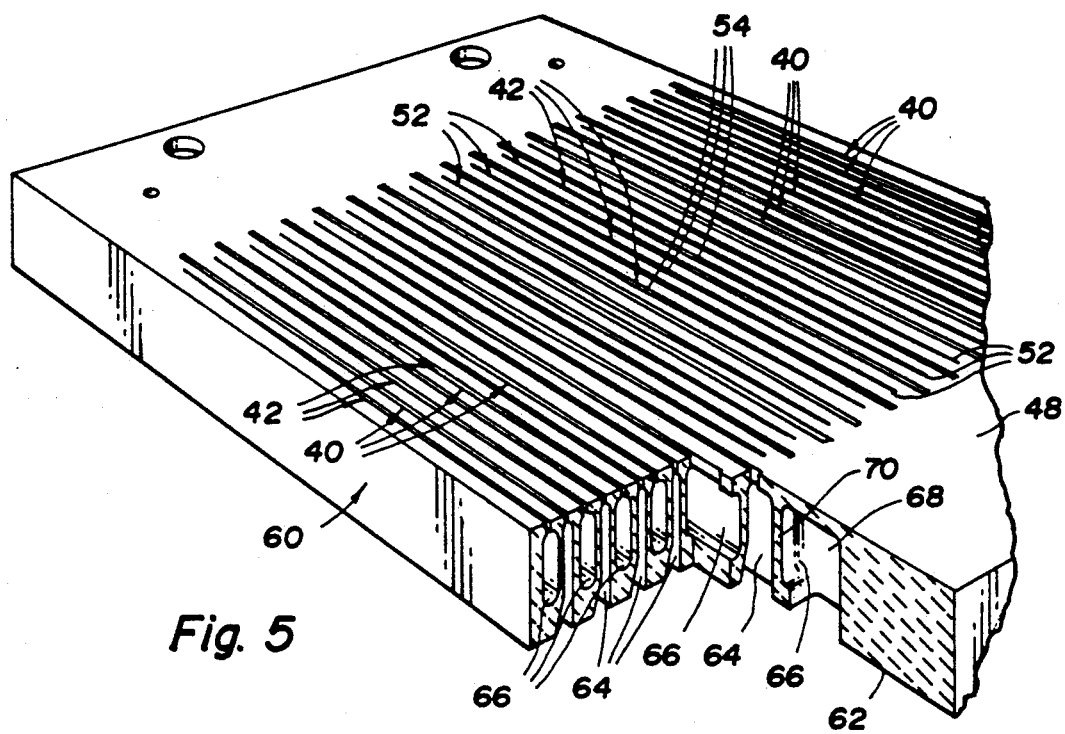
FIG. 5 is a partially broken away perspective view of a platen of a manifold of the annealing lehr through which pressurized gas is fed for recirculating flow to support and slowly cool the glass sheet strip during the annealing.

As shown in FIG. 3, each of the lower and upper manifolds 34 and 36 is molded from a suitable refractory material such as sinter bonded fused silica so as to have good resistance to thermal warpage. More specifically, each manifold includes a cast platen 60 that defines the surface 48 in which the supply and exhaust openings are located with the constructions previously described. Each platen 60 also has a surface 62 that extends parallel to its planar surface 48 and defines elongated plenum portions 64 extending therefrom with an initially converging shape to feed the supply passages 56 that feed the pressurized gas to the supply openings 40 as previously described. Each platen 60 also includes elongated exhaust chambers 66 that receive gas from the exhaust passages 58 and have opposite ends that are communicated with associated return passages 68 shown in FIG. 5. An associated end wall 70 isolates each return passage 68 from the adjacent plenum portion 64 while providing the communication thereof with the exhaust chambers 66 so as to permit recirculating flow of the gas as is hereinafter more fully described.

As also illustrated in FIG. 3, each of the lower and upper manifolds 34 and 36 also includes a cast manifold member 72 that feeds the pressurized gas to the supply openings of the associated platen 60 and receives the gas from the exhaust openings of the platen for recirculating flow back to the supply openings. These manifolds 72 are respectively located below and above the platen 60 of the lower and upper manifolds and are secured thereto by associated bolt-type fasteners 74.

Figure 4:
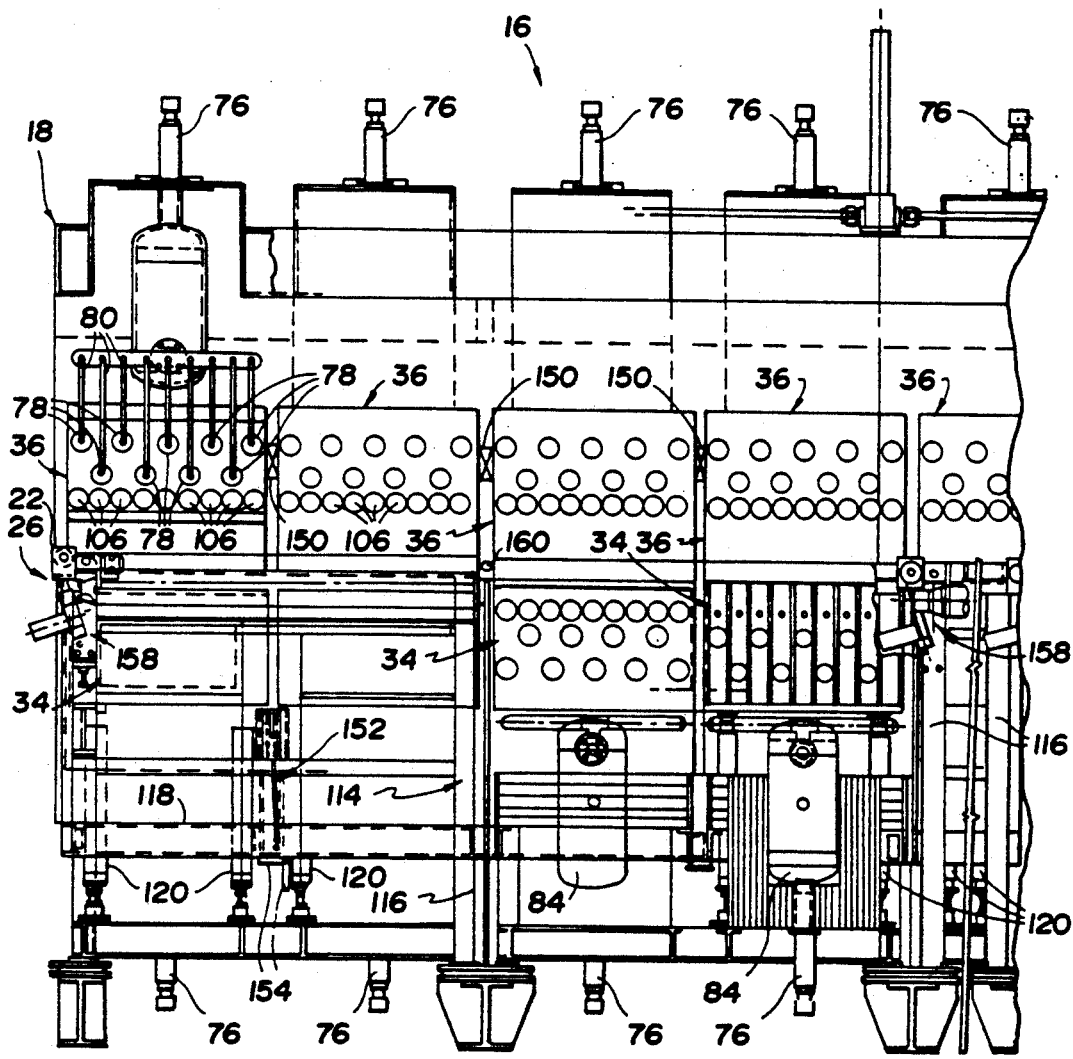
FIG. 4 is a side elevational view of the annealing lehr taken along the direction of line 4—4 in FIG. 3.

As also shown in FIG. 3, each of the lower and upper manifolds 34 and 36 additionally includes a gas burner 76 and at least one gas jet pump 78 mounted by the manifold member 72. In the preferred construction disclosed, there are a plurality of gas jet pumps 78 mounted by each manifold member 72, specifically nine each side thereof, and as illustrated in FIG. 4 these gas jet pumps are located in a staggered array of lower and upper sets. Each of these gas jet pumps is connected by feeder conduits 80 fed by an associated main conduit 82 from a mixing chamber 84 to which the heated products of combustion are fed from the associated gas burner 76. These heated products of combustion are fed to the gas jet pumps 78 for flow through a restricted nozzle 86 to provide a primary gas flow 88 that induces a secondary flow 90 of the return gas received from the exhaust openings of the associated platen 60 for recirculating flow of the mixed gas as shown by arrows 92 back to the supply openings. Delivery members 94 feed the mixed flow back to the supply openings as is hereinafter more fully described.

Figure 2:
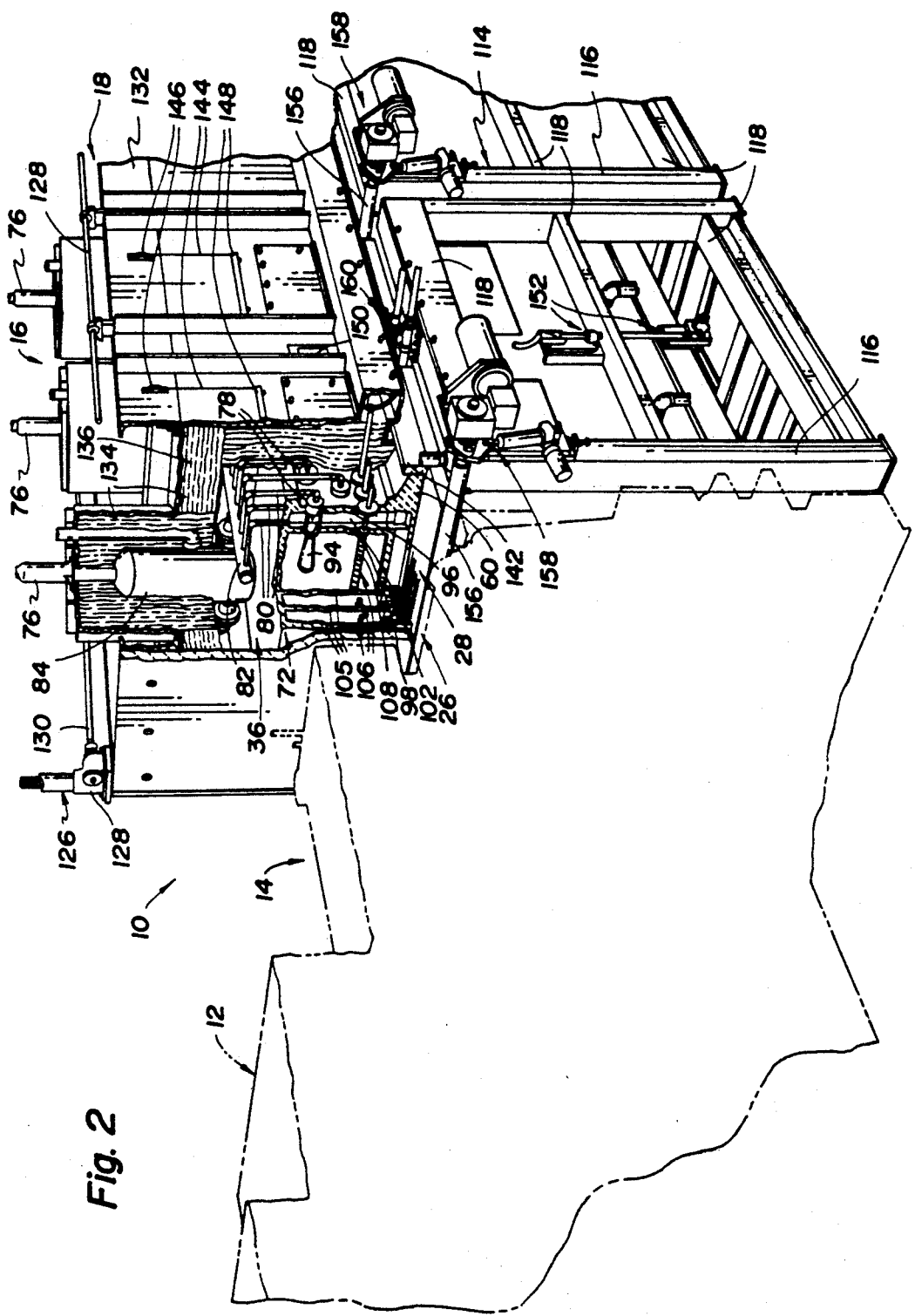
FIG. 2 is a partially broken away perspective view of an entry end of a housing of the annealing lehr.

As best illustrated in FIG. 3, each manifold member 72 includes two pairs of spaced outer and inner side walls 96 and 98 that extend generally vertically from a horizontal wall 100 to the associated platen 60. Each pair of outer and inner spaced side walls 96 and 98 defines a return passage 102 for receiving gas from the exhaust openings of the platen via the return passages 68 previously described in connection with FIG. 5. As previously mentioned in connection with FIGS. 3 and 4, a plurality of the gas jet pumps 78 are associated with each manifold 34 and 36 and are mounted on each pair of spaced side walls 96 and 98 thereof in staggered lower and upper sets. These gas jet pumps as was also previously mentioned, function to mix the pressurized and heated products of combustion received from the gas burner 76 through the feeder and main conduits 80 and 82 and the mixing chamber 84 so as to mix with the gas returned from the exhaust openings of the associated platen 60 for recirculating flow back to the supply openings of the platen. The two pairs of spaced side walls 96 and 98 are also spaced from each other to cooperate with each other and with the horizontal wall 100 thereof as well as the surface 62 of the associated platen to define a mixing plenum 104 in which the pressurized gas is received from opposite directions from the gas jet pumps for mixing prior to being fed to the supply openings of the platen as previously described in connection with FIG. 7. This mixing plenum chamber 104 is divided by vertical walls 105 spaced as shown in FIG. 2 along the length of the lehr along which the glass sheet strip is moved A pair of the gas jet pumps 78 feed pressurized gas between each pair of vertical walls 105 from opposite directions at upper and lower positions that alternate along the direction of the glass sheet strip movement. Such a construction provide a circular mixing as shown by arrows 103 in FIG. 3 to thereby provide pressure and temperature uniformity. Any variation in the gas delivery pressure and temperature over the lateral width of the manifolds due to the upper and lower locations of the two gas jet pumps 78 that feed between each pair of vertical walls 105 is accommodated for by the alternating relationship of these positions along the direction of movement of the glass sheet strip. Furthermore, pressure variations along the lateral width are the same both above and below the glass sheet strip G in order to maintain planarity.

As illustrated in FIGS. 2 through 4, each manifold member 72 also includes temperature controllers 106 for controlling the temperature of the pressurized gas delivered from the mixing chamber to the supply openings of the associated platen 60. More specifically, each temperature controller 106 as shown in FIG. 2 includes an electric resistance element 108 to which a voltage is applied as needed to provide the appropriate temperature at the particular location involved so as to provide the proper degree of heating at that location of the annealing lehr. These temperature controllers 106 are mounted between vertical walls 105 by the spaced side walls 96 and 98 of the associated manifold member 72 toward the glass sheet strip from the gas jet pumps 78 such that all of the gas delivered from the gas jet pumps must pass by the temperature controllers and thus be heated thereby so as to provide the proper temperature of the pressurized gas delivered to the supply openings. One temperature controller 106 and two gas jet pumps 78 are mounted between each pair of vertical walls 105 of the manifold member 72. The good temperature control achieved with the lehr allows nonlinear cooling that can decrease the time needed to perform the annealing. For example, after the glass sheet strip is cooled below the strain point, holding its temperature for a minute or slightly longer at about 545° centigrade allows subsequent cooling at a faster rate to 480° centigrade, without inducing temporary internal stresses that would fracture the glass without the pause in cooling, while providing an overall faster cooling time. Likewise, other nonlinear cooling curves can be utilized due to the good temperature control achieved.

With the embodiment of FIGS. 2 through 7, the glass sheet strip G is floated by the pressurized gas above the planar surface 48 of each lower manifold 34 a very small distance, such as about 1 to 2 millimeters, and is spaced below the planar surface 48 of each upper manifold 36 by a distance that is normally greater than the lower spacing such as two to several times the lower spacing. The extent of each spacing for best results depends upon glass thickness, the speed of conveyance, the temperature involved and other operating parameters.

Figure 8:
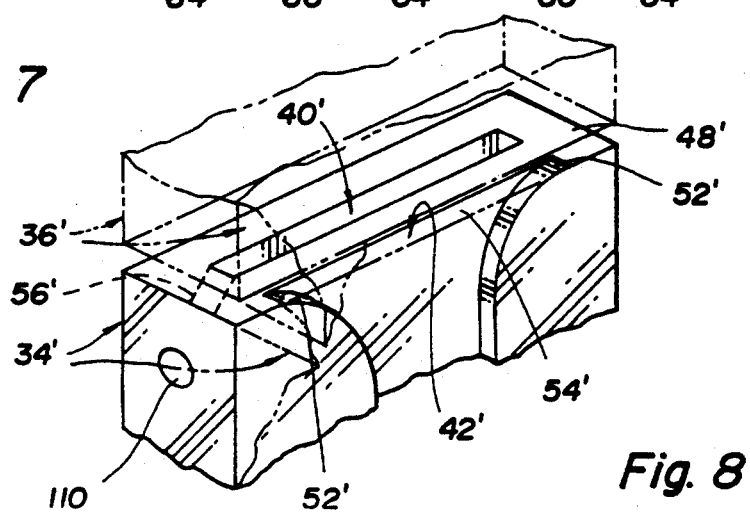
FIG. 8 is a perspective view illustrating another embodiment of the manifold.

With reference to FIG. 8, another construction for the lower and upper manifolds is illustrated by the one lower manifold 34' shown by solid line representation. This manifold is fabricated from sheet metal as opposed to being molded from refractory material like the previously described embodiment and is utilized with a plurality of like lower manifolds 34' and, preferably, with a plurality of like upper manifolds 36' as shown by phantom line representation so that the glass sheet strip can be conveyed therebetween in a generally similar manner to the previously described embodiment. The manifold 34' has a gas supply opening 40' of an elongated shape that extends transversely to the direction of movement of the glass sheet strip as with the previously described embodiment. At its downstream side, the lower manifold 34' has a construction for cooperating with the planar upstream side of the adjacent lower manifold 34' to define an exhaust openings 42' of an elongated shape that receives the gas after impingement with the glass sheet strip. This exhaust opening has opposite ends 52' and a central portion 54'. As with the previously described embodiment, the elongated gas exhaust opening 42' has a progressively increasing flow area in a direction toward the central portion 54' thereof from its opposite ends 52' so as to prevent a gas pressure buildup at the center of the conveyed glass sheet strip. While this progressively increasing flow area in the previously described embodiment is provided by an increasing width of the exhaust opening, the fabricated sheet metal embodiment of the manifold 34' provides the increasing flow area by a progressively increasing depth of the exhaust opening 42' from its ends 52' toward its central portion 54'. Hot pressurized gas such as from the products of combustion of an associated gas burner are fed into side inlets 110 for flow to the supply openings 40' preferably through supply passages 56' that are inclined like with the previously described embodiment.

As illustrated in FIG. 1, the conveyor drive 32 of the annealing lehr 16 includes at least one roller 112 that engages the lower surface of the glass sheet strip G to pull the strip from the entry end 22 of the housing 18 toward the exit end 24 thereof over the gas support 28 provided by the gas manifolds as previously described. Normally, the roller drive 32 will also include other rollers of a conveyor on which final cooling takes place.

As best illustrated in FIG. 3, the annealing lehr includes a framework generally designated by 114 for supporting the components of the housing 18. This housing framework 114 includes vertical legs 116 and horizontal beams 118 that extend between and are supported by the legs. Each lower manifold 34 has four associated lower jacks 120 whose lower ends are supported by an associated horizontal beam 118 and whose upper ends support the adjacent corner of the manifold member 72. These jacks 120 extend through an insulated floor 122 of the housing 18 just inward from insulated lower side walls 124 of the housing. Upper vertical jacks 126 of the framework 114 have lower ends supported by adjacent horizontal beams 118 and have vertically movable carriages 128 that are connected as shown in FIG. 2 by coupling shafts 130 along the longitudinal length of the housing. These carriages 128 are connected by longitudinally extending beams 132 shown in FIG. 3 and support an insulated ceiling 134 and insulated upper side walls 136 for vertical movement as the jack carriages 128 are adjusted. Suspension rods 138 and 140 support each upper manifold 36. More specifically, four of the suspension rods 138 have upper ends supported by the insulated ceiling 134 and have lower ends that support the four corners of the platen 60 of the upper manifold 36. Likewise, four of the suspension rods 140 have upper ends also supported by the insulated ceiling 134 and have lower ends that support the four corners of the manifold member 72 of the associated upper manifold 36. The upper and lower ends of these suspension rods 138 and 140 have threaded connections that provide securement so that the upper platen 60 is level, while vertical adjustment of the carriages 128 as previously described spaces the upper platen 60 at the appropriate elevation with respect to the lower platen 60 whose elevation is controlled by the lower jacks 120 as previously described.

As shown in FIGS. 1 and 2, vertically movable doors 142 that are preferably constructed of ceramic material such as by molding from sinter bonded fused silica particles are located at each side of the upper platen 60. A pair of chains 144 are connected to the doors 142 and extend over pulleys 146 mounted on the horizontally extending beams 132 in a suitable manner, and from the pulleys the chains 144 extend downwardly to a horizontal handle 148 that is movable downwardly to thus pull the door 142 upwardly and permit viewing of the glass sheet strip at the adjacent location.

As shown in FIG. 2 and schematically in FIG. 4, windows 150 are located between the adjacent upper manifolds 36 to permit viewing of the conveyed glass sheet strip in addition to the viewing permitted by the opening of the doors 142 as previously described in connection with FIGS. 2 and 3.

As shown in FIGS. 2 through 4, a cullet door mechanism 152 is located at one side of the housing 18 and controls positioning of a lower cullet door 154 between a horizontal closed position that maintains the pressurized atmosphere within the lehr housing 18 and a vertical open position that permits cullet to fall downwardly when the glass sheet strip is broken.

As illustrated in FIGS. 2 and 4, start-up rolls 156 are located between alternate sets of the lower and upper manifolds and normally positioned during steady state operation below the glass sheet strip by associated positioning and drive mechanisms 158. During start-up operation, these mechanisms 158 raise the start-up rolls 156 to initially convey the glass sheet strip G through the annealing layer in order to facilitate reaching the steady state operation as previously described. Between each adjacent pair of start-up roll drive mechanisms 158, the annealing layer includes a pyrometer assembly 160 for measuring the temperature profile of the glass sheet strip along its lateral width during the conveyance.

While the best modes for carrying out the invention have been described in detail, those familiar with the art to which this invention relates will recognize various alternative designs and embodiments for practicing the invention as defined by the following claims.

What is claimed is:

1. A glass sheet strip annealing lehr comprising:
    a housing defining a heated chamber and having an entry end for receiving a continuous hot glass sheet strip having lower and upper surfaces just after forming of the strip prior to cooling below the annealing point, said housing having an exit end from which the strip exits the heated chamber, and the heated chamber having a decreasing temperature from the entry end of the housing toward the exit end thereof to provide cooling that anneals the strip; and
    a conveyor including a gas support means that delivers upwardly directed pressurized gas to provide the sole support of the glass sheet strip within the housing until the surfaces of the strip are cooled below the strain point, the gas support means including at least one lower manifold having (a) supply openings through which the pressurized gas is fed for impingement with the glass sheet strip and (b) exhaust openings through which the gas is exhausted after impingement with the glass sheet strip, each manifold including at least one mixing plenum and a gas burner, each manifold including a pair of gas jet pumps for receiving the heated products of combustion from the gas burner thereof for mixing with gas returned from the exhaust openings to provide gas flows to the mixing plenum which feeds the supply openings, the pair of gas jet pumps being mounted at different elevations and arranged to provide the gas flows therefrom in opposite directions with respect to each other to enhance gas mixing of the gas flows from the pair of jet pumps within the mixing plenum, and the conveyor including a drive for engaging the strip after the surfaces thereof are cooled below the strain point to pull the strip from the entry end of the housing toward the exit end thereof over the gas support means.

2. A glass sheet strip annealing lehr as in claim 1 wherein the gas support means of the conveyor includes:
    an upper manifold having supply openings to which gas is fed for downward flow that impinges with the glass sheet strip to cooperate with the upward gas flow in providing uniform forced convection heat transfer with the lower and upper surfaces of the strip, and having exhaust openings through which the gas is exhausted after impingement with the glass sheet strip.

3. A glass sheet strip annealing lehr as in claim 2 wherein the supply and exhaust openings of each of the lower and upper manifolds includes:
    elongated supply openings through which the pressurized gas is fed for impingement with the glass sheet strip; and
    elongated exhaust openings through which the gas is exhausted after impingement with the glass sheet strip.

4. A glass sheet strip annealing lehr as in claim 3 wherein the supply and exhaust openings of each manifold are arranged in an alternating relationship along the direction of movement of the glass sheet strip.

5. A glass sheet strip annealing lehr as in claim 4 wherein each manifold is constructed with each elongated exhaust opening having opposite ends and a central portion between the opposite ends, and the opposite ends defining a progressively increasing flow area in a direction toward the central portion thereof to prevent a gas pressure buildup at the center of the strip.

6. A glass sheet strip annealing lehr as in claim 2 wherein each manifold has supply passages that are inclined and feed the supply openings so as to provide driving of the glass sheet strip by the pressurized gas flow toward the exit end of the housing.

7. A glass sheet strip annealing lehr as in claim 3 wherein the conveyor includes a plurality of sets of lower and upper manifolds between the entry and exit ends of the housing.

8. A glass sheet strip annealing lehr as in claim 7 wherein each manifold is fabricated from sheet metal.

9. A glass sheet strip annealing lehr as in claim 7 wherein each manifold is molded from refractory material.

10. A glass sheet strip annealing lehr as in claim 9 wherein each manifold includes a cast platen having a surface that defines the supply and exhaust openings which have elongated shapes that extend transversely to the direction of movement of the glass sheet strip and are arranged in an alternating relationship with respect to each other, and also including a cast manifold member that feeds the pressurized gas to the supply openings of the platen and receives the gas from the exhaust openings of the platen for recirculating flow back to the pair of gas jet pumps.

11. A glass sheet strip annealing lehr as in claim 10 wherein each manifold member includes two pairs of spaced side walls defining the mixing plenum therebetween, each pair of spaced side walls defining a return passage therebetween for receiving the gas from the exhaust openings of the platen, one gas jet pump of each pair of gas jet pumps being mounted on one pair of the pair of spaced side walls and functioning to mix the pressurized and heated products of combustion received from the gas burner with the gas returned from the exhaust openings of the platen for the recirculating flow back to the supply openings of the platen.

12. A glass sheet strip annealing lehr as in claim 11 wherein each manifold member also includes temperature controllers for controlling the temperature of the pressurized gas delivered from the mixing chamber to the supply openings of the platen.

13. A glass sheet strip annealing lehr as in claim 12 wherein each temperature controller includes an electric resistance element.

14. A glass sheet strip annealing lehr as in claim 12 wherein each manifold member also includes vertical walls spaced along the direction of movement of the glass sheet strip to divide the mixing plenum with one said temperature controller and one said pair of gas jet pumps located between each pair of vertical walls.

15. A glass sheet strip annealing lehr as in claim 1 wherein the conveyor drive includes a roller that engages the lower surface of the glass sheet strip to pull the strip from the entry end of the housing toward the exit end thereof over the gas support means.

16. A glass sheet strip annealing lehr comprising:
a housing defining a heated chamber and having an entry end for receiving a heated continuous glass sheet strip having lower and upper surfaces just after forming of the strip, said housing having an exit end from which the strip exits the heated chamber, and the heated chamber having a decreasing temperature from the entry end of the housing toward the exit end thereof to provide cooling that anneals the strip; and
a conveyor including a gas support means including lower and upper manifolds having elongated supply and exhaust openings that extend transversely to the glass sheet strip in a parallel and alternating relationship to each other and respectively deliver upwardly and downwardly directed pressurized gas, the upwardly delivered pressurized gas providing the sole support of the glass sheet strip within the housing until the surfaces of the strip are cooled below the strain point, the elongated exhaust openings that extend parallel to the elongated supply openings in a parallel and alternating relationship thereto receiving gas from the supply openings after impingement with the glass sheet strip, each manifold including at least one mixing plenum and a gas burner, each manifold including a pair of gas jet pumps for receiving the heated products of combustion from the gas burner thereof for mixing with gas returned from the elongated exhaust openings to provide gas flows to the mixing plenum which feeds the elongated supply openings, the pair of gas jet pumps being mounted at different elevations and arranged to provide the gas flows therefrom in opposite directions with respect to each other to enhance gas mixing of the gas flows from the pair of jet pumps within the mixing plenum, and the conveyor including a drive for engaging the strip after the surfaces thereof are cooled below the strain point to pull the strip from the entry end of the housing toward the exit end thereof over the gas support means.

17. A glass sheet strip annealing lehr comprising:
a housing defining a heated chamber and having an entry end for receiving a heated continuous glass sheet strip having lower and upper surfaces just after forming of the strip, said housing having an exit end from which the strip exits the heated chamber, and the heated chamber having a decreasing temperature from the entry end of the housing toward the exit end thereof to provide cooling that anneals the strip; and
a conveyor including a gas support means including lower and upper manifolds each of which includes a platen cast from refractory material to define elongated supply openings that extend transversely to the glass sheet strip in a parallel relationship to each other and deliver upwardly and downwardly directed pressurized gas to provide the sole support of the glass sheet strip within the housing until the surfaces of the strip are cooled below the strain point, the platen of each manifold also having elongated exhaust openings that extend parallel to the elongated supply openings in a parallel relationship thereto and receive gas from the supply openings after impingement with the glass sheet strip, each manifold also including a manifold member cast from a refractory material and having a mixing plenum from which pressurized gas is fed to the supply openings of the platen, each manifold member also having at least one return passage that receives the gas from the supply openings after impingement with the glass sheet strip, a pair of gas jet pumps mounted by the manifold member of each manifold to receive gas returned from the exhaust openings, each manifold also including a gas burner that feeds heated products of combustion to the gas jet pumps thereof to provide a primary gas flow that induces a secondary gas flow of gas returned from the exhaust openings to provide gas flows to the mixing plenum from which the gas is delivered to the supply openings, the pair of gas jet pumps being mounted at different elevations and arranged to provide the gas flows therefrom in opposite directions with respect to each other to enhance gas mixing of the gas flows from the pair of jet pumps within the mixing plenum prior to delivery to the supply openings, and the conveyor including a drive for engaging the strip after the surfaces thereof are cooled below the strain point to pull the strip from the entry end of the housing toward the exit end thereof over the gas support means.

* * * * *